US006757606B1

(12) United States Patent
Gonring

(10) Patent No.: US 6,757,606 B1
(45) Date of Patent: Jun. 29, 2004

(54) METHOD FOR CONTROLLING THE OPERATION OF AN INTERNAL COMBUSTION ENGINE

(75) Inventor: Steven J. Gonring, Slinger, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/452,622

(22) Filed: Jun. 2, 2003

(51) Int. Cl.[7] .................................................. B60T 7/12

(52) U.S. Cl. ....................... 701/103; 701/104; 701/110; 701/115; 123/406.23

(58) Field of Search ................................ 701/103, 104, 701/105, 110, 115; 123/406.64

(56) References Cited

U.S. PATENT DOCUMENTS

| | | | | | |
|---|---|---|---|---|---|
| 3,906,437 | A | * | 9/1975 | Brandwein et al. | 340/945 |
| 4,379,332 | A | * | 4/1983 | Busser et al. | 701/105 |
| 4,438,497 | A | | 3/1984 | Willis et al. | 364/431.05 |
| 4,846,283 | A | * | 7/1989 | Batcheller | 172/10 |
| 5,162,997 | A | * | 11/1992 | Takahashi | 701/1 |
| 5,170,343 | A | * | 12/1992 | Matsuda | 700/79 |
| 5,182,710 | A | * | 1/1993 | Tomisawa | 701/56 |
| 5,426,585 | A | | 6/1995 | Stepper et al. | 364/424.03 |
| 5,579,648 | A | * | 12/1996 | Hanson et al. | 62/126 |
| 5,848,582 | A | | 12/1998 | Ehlers et al. | 123/486 |
| 6,378,506 | B1 | | 4/2002 | Suhre et al. | 123/564 |
| 6,405,692 | B1 | | 6/2002 | Christiansen | 123/65 BA |
| 6,405,714 | B1 | | 6/2002 | Bylsma et al. | 123/480 |
| 6,408,832 | B1 | | 6/2002 | Christiansen | 123/563 |
| 6,439,188 | B1 | | 8/2002 | Davis | 123/193.2 |

* cited by examiner

*Primary Examiner*—John Kwon
(74) *Attorney, Agent, or Firm*—William D. Lanyi

(57) ABSTRACT

A method for controlling the operation of an internal combustion engine includes the storing of two or more sets of operational relationships which are determined and preselected by calibrating the engine to achieve predetermined characteristics under predetermined operating conditions. The plurality of sets of operational relationships are then stored in a memory device of a microprocessor and later selected in response to a manually entered parameter. The chosen set of operational relationships is selected as a function of the selectable parameter entered by the operator of the marine vessel and the operation of the internal combustion engine is controlled according to that chosen set of operational parameters. This allows two identical internal combustion engines to be operated in different manners to suit the needs of particular applications of the two internal combustion engines.

20 Claims, 4 Drawing Sheets

METHOD FOR CONTROLLING THE OPERATION OF AN INTERNAL COMBUSTION ENGINE

BACKGROUND OF THE INVENTION

1. Field of the Invention

The present invention is generally related to a method for controlling the operation of an internal combustion engine and, more particularly, to a method for selecting appropriate operational relationships between various parameters of the engine of an outboard motor based on the specific and particular intended application of the outboard motor.

2. Description of the Prior Art

Internal combustion engines can be tuned, or calibrated, to operate in specific ways under a particular set of conditions. Those skilled in the art of internal combustion engines, and particularly in the field of outboard motors, are aware of various changes that can be made in the relationship between engine operating parameters which can result in desired operating characteristics.

U.S. Pat. No. 6,405,714, which issued to Bylsma et al on Jun. 18, 2002, described a method and apparatus for calibrating and controlling fuel injection. A method for calibrating an electronic control unit for an internal combustion engine is described. The electronic control unit may have multiple channels with each channel being adapted to provide an input drive signal to a fuel delivery apparatus. A first channel is selected for calibration. A reference signal of desired and known parameters is also defined. The reference signal is defined such that it is indicative of the cyclical performance of a fuel delivery apparatus such as a fuel injection device. A command signal is generated and passed through the circuitry of the selected channel. The channel circuitry generates a drive signal in response to the command signal. A desired parameter of the drive signal is measured for comparison with the known parameter of the reference signal. If necessary, the command signal is then adjusted so as to produce a modified drive signal which has a parameter with reduced variation from the known reference parameter.

U.S. Pat. No. 5,426,585, which issued to Stepper et al on Jun. 20, 1995, describes a method and apparatus for generating calibration information for an electronic engine control module. A method and apparatus for generating calibration information in which a subfile type is defined for each of a plurality of categories of data including engine control data, engine family data, vehicle interface data, software sequencing data, electronic configuration data, and memory configuration data is described. A separate subfile is created in memory for each of the plurality of individual sets of data in each of the data categories. Each subfile is automatically provided with line checksums, a cyclic redundancy code, date information, a subfile type identifier, and a subfile authorization level, and data entries are automatically verified based on rules stored in memory in a rules file, each of the subfile types having an associated rules file, and each of the rules files defining criteria for individual data items and for interrelationships between data items in its associated subfile type. A compatibility file is created in memory to identify subfile of one type which are compatible with a subfile of another type. Each subfile and the compatibility file are distributed individually via an electronic communication link to multiple service computers programmed to determine compatibility among selected subfiles based on information stored in the compatibility file and to assemble compatibility subfiles into a calibration file for a particular engine control module.

U.S. Pat. No. 4,438,497, which issued to Willis et al on Mar. 20, 1984, describes an adaptive strategy to control an internal combustion engine. The specification discloses a method for adaptively controlling engine calibration control values. The strategy includes the steps of predicting a driving pattern based on analysis of recent past driving patterns and selecting engine control values appropriate for the predicted driving pattern and a desired emission constraint. The adaptive strategy adjusts spark timing and magnitude of EGR as a function of engine energy usage per distance traveled while maintaining feedgas emissions at a constant level over a wide variety of driving patterns including urban, suburban and highway. A plurality of driving cycle segments are analyzed to generate a table of engine calibration control values for the adaptive spark and EGR control strategy. This adaptive strategy has fuel consumption characteristics which are most advantageous at the most constrained feedgas levels. Drivability can be enhanced because of the greater calibration flexibility inherent in the adaptive technique.

U.S. Pat. No. 6,439,188, which issued to Davis on Aug. 27, 2002, discloses a four cycle four cylinder in-line engine with rotors of a supercharging device used as balance shafts. A four cycle four cylinder in-line internal combustion engine is provided with a housing structure that contains two shafts which rotate in opposite directions to each other and at the same rotational velocity. Pairs of counterweights are attached to the two shafts in order to provide a counterbalance force which is generally equal to and opposite from the secondary shaking force which results from the reciprocal movement of the pistons of the engine. The first and second shafts are rotors of a supercharging device, such as a Roots blower. The rotational speed of the first and second shafts is twice that of the rotational speed of the crankshaft of the engine and the provision of counterweights on the first and second shafts balances the secondary forces caused by the reciprocal motion of the pistons in the engine.

U.S. Pat. No. 6,408,832, which issued to Christiansen on Jun. 25, 2002, discloses an outboard motor with a charge air cooler. The outboard motor is provided with an engine having a screw compressor which provides a pressurized charge for the combustion chambers of the engine. The screw compressor has first and second screw rotors arranged to rotate about vertical axes which are parallel to the axis of a crankshaft of the engine. A bypass valve regulates the flow of air through a bypass conduit extending from an outlet passage of the screw compressor to the inlet passage of the screw compressor. A charge air cooler is used in a preferred embodiment and the bypass conduit then extends between the cold side plenum of the charge air cooler and the inlet of the compressor. The charge air cooler improves the operating efficiency of the engine and avoids overheating the air as it passes through the supercharger after flowing through the bypass conduit. The bypass valve is controlled by an engine control module in order to improve power output from the engine at low engine speeds while avoiding any violation of existing limits on the power of the engine at higher engine speeds.

U.S. Pat. No. 6,405,692, which issued to Christiansen on Jun. 18, 2002, discloses an outboard motor with a screw compressor supercharger. The outboard motor is provided with an engine having a screw compressor which provides a pressurized charge for the combustion chambers of the engine. The screw compressor has first and second screw rotors arranged to rotate about vertical axes which are parallel to the axis of a crankshaft of the engine. A bypass valve regulates the flow of air through a bypass conduit extending from an outlet passage of the screw compressor to the inlet passage of the screw compressor. A charge air cooler is used in a preferred embodiment and the bypass conduit then extends between the cold side plenum of the charge air cooler and in the inlet of the compressor. The bypass valve is controlled by an engine control module in order to improve power output from the engine at low engine speeds while avoiding any violation of existing limits on the power and the engine at higher engine speeds.

U.S. Pat. No. 6,378,506, which issued to Suhre et al on Apr. 30, 2002, discloses a control system for an engine supercharging system. A bypass control valve is controlled by an engine control module as a function of manifold absolute pressure and temperature within an air intake manifold in conjunction with the barometric pressure. An air per cylinder (APC) magnitude is calculated dynamically and compared to a desired APC value which is selected as a function of engine operating parameters. The air per cylinder value is calculated as a function of the manifold absolute pressure, the cylinder swept volume, the volumetric efficiency, the ideal gas constant, and the air inlet temperature. The volumetric efficiency is selected from stored data as a function of engine speed and a ratio of manifold absolute pressure to barometric pressure.

U.S. Pat. No. 5,848,582, which issued to Ehlers et al on Dec. 15, 1998, describes an internal combustion engine with barometric pressure related start of air compensation for a fuel injector. The control system is provided with a method by which the magnitude of the start of air point for the injector system is modified according to the barometric pressure measured in a region surrounding the engine. This offset, or modification, of the start of air point adjusts the timing of the fuel injector system to suit different altitudes at which the engine may be operating.

The patents described above are hereby expressly incorporated by reference in the description of the present invention.

When calibrating an internal combustion engine, the goal is usually to develop a calibration scheme which satisfies a wide variety of running conditions that the engine can experience. For example, the engines of outboard motors can be used for waterskiing, fishing, high-performance, or commercial markets. Each of these uses and applications of outboard motor engines can operate more efficiently if different engine characteristics could be provided in the calibration procedure. However, since the specific use and application of the engine of an outboard motor is often unknown and cannot always be predicted accurately, a typical calibration procedure applies certain accommodations that are made in order to calibrate the engine in an acceptable manner for any and all of the potential uses. These accommodations may affect torque, acceleration, fuel economy, idle operation quality, knock, and other operating characteristics. The result of this technique is to create a calibration which achieves average performance in all of these categories.

In certain marine applications, a manually controlled throttle handle is used to electronically control the throttle of an engine of a marine propulsion system. In other words, no cables or mechanical linkages are employed between the manually controlled throttle handle and the throttle body of the engine. In applications like this, it could be beneficial if the relationship of movement between the throttle handle and the throttle plate within the throttle body could be made changeable according to the specific application of the engine. For example, in a racing application one response profile might be most desirable, whereas in a trolling operation a different profile is most desirable.

It would therefore be significantly beneficial if a method could be provided to quickly and efficiently change the operation of the engine from one calibration scheme to another at the request of the operator of the marine vessel.

SUMMARY OF THE INVENTION

A method for controlling the operation of an internal combustion engine, made in accordance with the preferred embodiment of the present invention, comprises the steps of providing a first set of operational relationships which is preselected for use in a first type of application of the internal combustion engine. It also comprises the step of providing a second set of operational relationships which is preselected for use in a second type of application of the internal combustion engine. The method further comprises the step of monitoring a manually selectable parameter and selecting a chosen set of operational relationships from the first and second sets, as a function of the selectable parameter. It also comprises the step of controlling the operation of the internal combustion engine according to the chosen set of operational relationships. The manually selectable parameter can be a resistance magnitude of a resistance component, a manual selection made through the use of a data entry terminal, or a status of one or more switches.

The first and second sets of operational relationships can comprise a plurality of values of engine operating speeds, each of which is stored as a function of a position of a manually movable throttle selector. Alternatively, the first and second sets of operational relationships can comprise a plurality of ignition timing values stored as a function of engine speed and load value, a plurality of values of a duration of air injection through a fuel injector stored as a function of engine operating speed and load value, a plurality of values of an amount of fuel injected through a fuel injector during each injector event stored as a function of engine speed and load value, a plurality of fuel injection timing values stored as a function of engine speed and load value, or a plurality of throttle plate positions for a supercharger bypass conduit stored as a function of engine speed.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
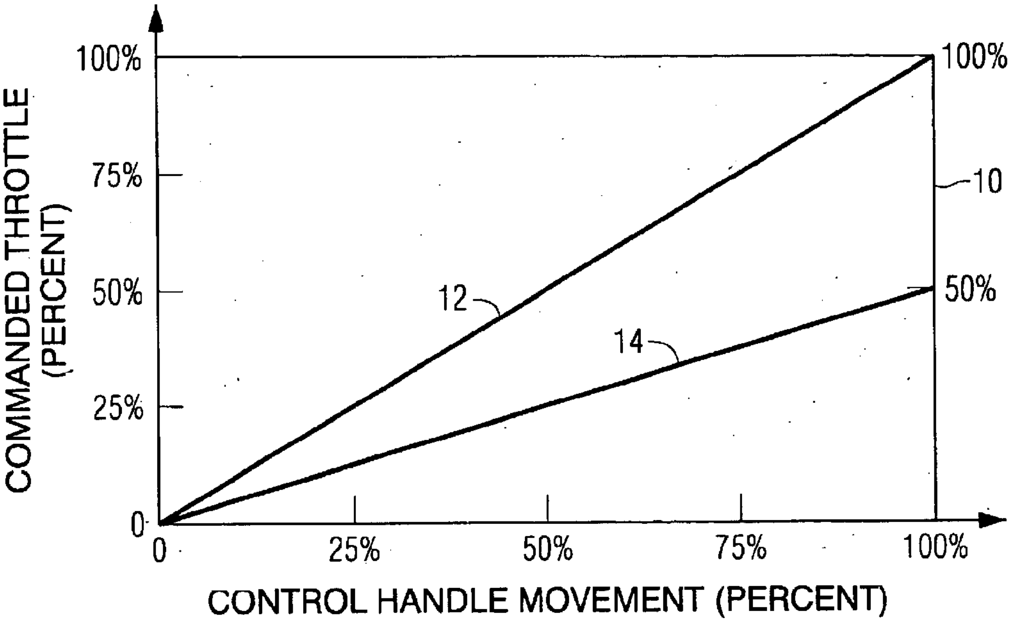
FIG. 1 PRIOR ART
FIG. 1 is a graphical representation of the results of using a prior art throttle control system.

Throughout the description of the preferred embodiment of the present invention, like components will be identified by like reference numerals.

FIG. 1 shows the result, in graphical form, of a known method for providing more than one response characteristic for a manually controlled throttle handle of a marine vessel. The horizontal axis in FIG. 1 shows the percentage of movement of a manually controllable throttle handle from an idle position through a wide open throttle (WOT) position 10. The response of the actual throttle of the engine is represented on the vertical axis. As can be seen, a normal operating relationship, represented by line 12, is linear between an idle speed and wide open throttle (WOT). This is a normal relationship between the throttle handle and the throttle plate of the throttle body. In certain situations, a known control system decreases the change in actual throttle position when the marine vessel is operated in a docking mode. This is represented by line 14. When in the docking mode, more movement of the throttle handle is required to change the actual operating speed of the engine. This is done to provide the operator of the marine vessel with more precise control of engine speed. The throttle mechanism used to provide the dual response characteristics illustrated in FIG. 1 is generally known to those skilled in the art and is mechanically implemented when the operator of the marine vessel selects a docking mode switch or a normal mode switch. Systems of this type are available in commercial quantities from the Teleflex Corporation.

Figure 2:
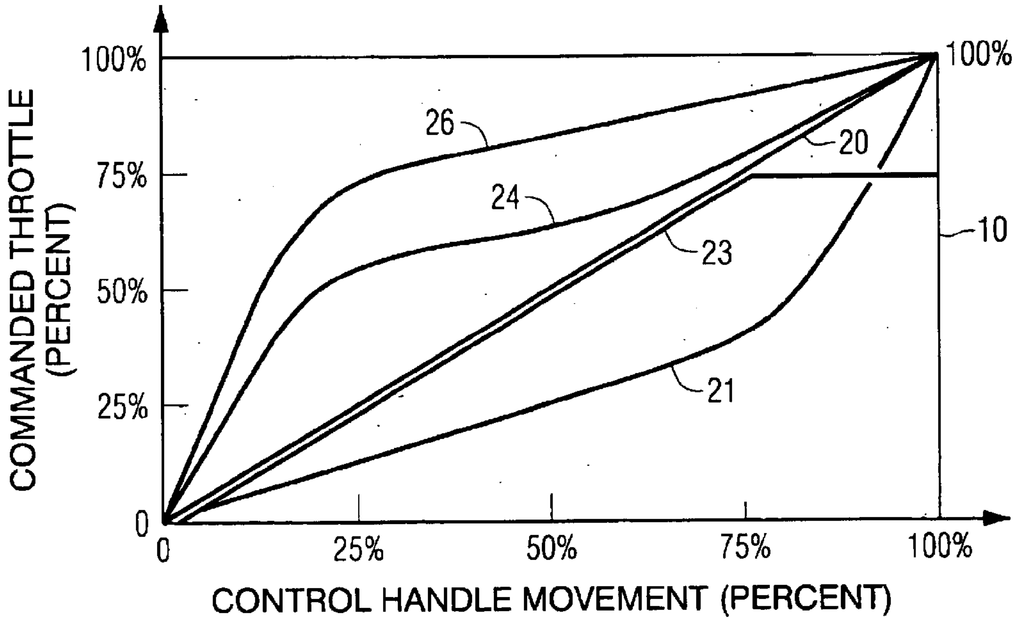
FIG. 2 is a graphical representation illustrating the possibilities of throttle control methods and results through the use of the present invention.

When an electronic remote control (ERC) throttle system is used on a marine vessel, it can be calibrated for many different types of operation, as illustrated in FIG. 2. The relationship between the control handle position and the actual throttle position of the engine can be tailored to suit many different applications. As an example, line 20 is the normal mode of operation and is generally similar to line 12 in FIG. 1. Line 20 is linear between an idle speed and a wide open throttle mode of operation as represented by line 10 in FIG. 2. When an electronic remote control system is used on a marine vessel, in which no mechanical cables or linkages are used between the manually controllable throttle handle and the actual throttle plate within the throttle body of the engine, many different characteristics can be implemented. As an example, a nonlinear docking mode relationship 21 simulates the effect of line 14 in FIG. 1 up to approximately 75% of full travel of the throttle handle and then provides an increased response above that position. A training mode of operation is represented by line 23, in which the maximum engine speed is limited regardless of the movement of the manually controllable throttle above approximately 75% of full travel of the handle. A nonlinear ski mode 24 and a nonlinear race mode 26 can also be provided. The selection of the response characteristic, represented lines 20, 21, 23, 24, and 26 in FIG. 2, depends on the intended operation of the marine vessel.

Figure 3:
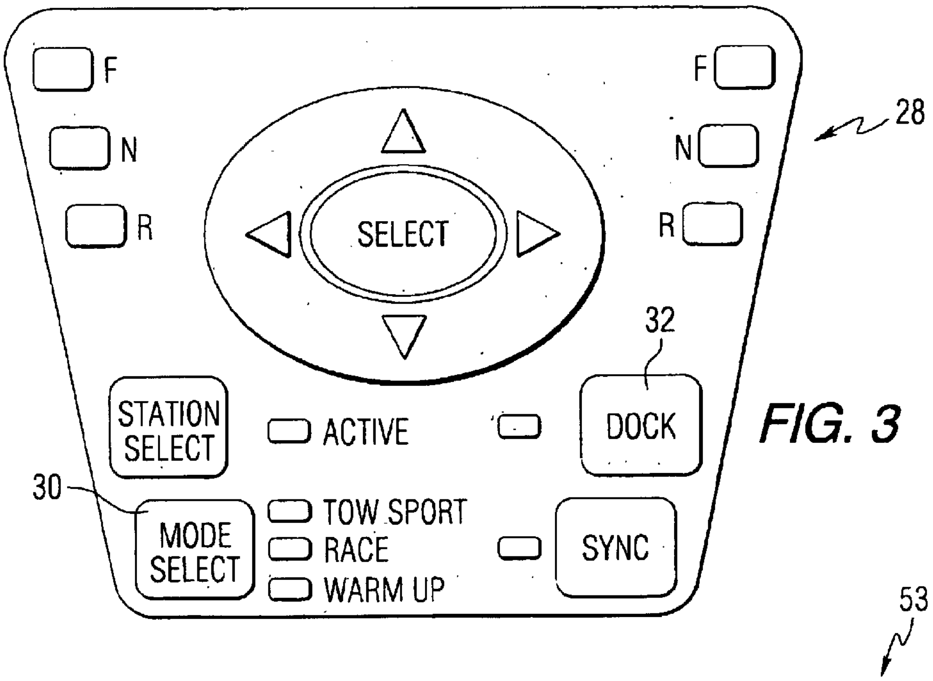
FIG. 3 shows a selector module that can be used in conjunction with the present invention.

FIG. 3 illustrates a control panel 28 that can be used by the operator of a marine vessel to choose a desired characteristic from the possible characteristics shown in FIG. 2. In addition to the forward, neutral, and reverse indications relating to both starboard and port engines, a mode selection 30 is provided in which the operator can choose among several engine applications. As an example, a push button 32 is provided to allow the operator of the marine vessel to select or deselect the docking mode. Other types of inputs can be provided to allow the operator to make other selections regarding the throttle control system.

In addition to allow the operation of a marine vessel to select among many different types of throttle control relationships, as illustrated in FIG. 2, the present invention also allows the operator of the marine vessel to select various operating characteristics of the engine. As an example, an outboard motor engine can be operated in a towing mode in which the engine calibration would be typically optimized for low and mid-range torque capabilities. This mode of operation would typically be used for towing a skier and certain commercial applications. Alternatively, the engine can be calibrated for a fuel economy mode of operation in which the calibration optimizes the fuel economy of the engine. This may decrease the acceleration or top speed capabilities of the engine. When calibrated for the performance mode of operation, acceleration and top speed are optimized and fuel economy or idle speed stability may be compromised. The calibration for performance mode would also typically be optimized for the use of high octane fuel, although this may compromise other performance characteristics, such as engine knock. When calibrated for the trolling mode of operation, idle stability, resistance to sparkplug fowling, low speed operation, and smokeless exhaust would be optimized. A cold weather mode of operation could be achieved by calibrating the engine to be optimized for cold starting conditions and cold engine block/head temperature conditions.

According to a preferred embodiment of the present invention, the engine control module (ECM) of the engine can be programmed to store a plurality of calibration data sets, in which each calibration data set is intended for use under a preselected set of conditions and to achieve a certain mode of operation. With reference to the above description, the engine control module (ECM) can be programmed to store trolling mode calibration data, cold weather operation data, performance mode data, fuel economy mode data, and tow mode data. Each data set would comprise one or more stored tables and/or formulae which are selected according to a calibration what was performed to maximize the effectiveness of the engine performance under a specific operating mode. These data sets would be stored in the engine control module or in associated memory modules, to be accessed when a mode selection is made.

Figure 4:
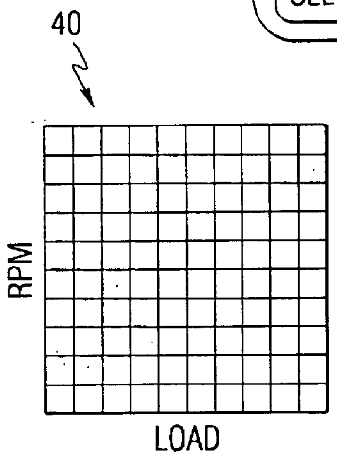
FIG. 4 is a highly schematic representation of a data table containing a first set of operational relationships stored as a function of two independent variables.

FIG. 4 represents a hypothetical map of a calibration setting stored as a function of engine load (LOAD) and engine speed (RPM). The set of operational relationships 40 shown in FIG. 4 can contain a plurality of ignition timing values stored as a function of load and engine speed. Alternatively, each of the entries in the table shown in FIG. 4 could be a value of a duration of air injection through a fuel injector during each injection event. Another alternative application of the present invention could store a plurality of values of an amount of fuel to be injected through a fuel injector during each injector event as a function of load and speed. Furthermore, the table 40 in FIG. 4 could store a plurality of fuel injection timing values stored as a function of engine operating speed and load. Still further, a plurality of throttle plate positions for a supercharger bypass conduit can be stored, either as a function of engine load and engine speed as illustrated in FIG. 4 or, alternatively, as a function of only engine speed.

Figure 5:
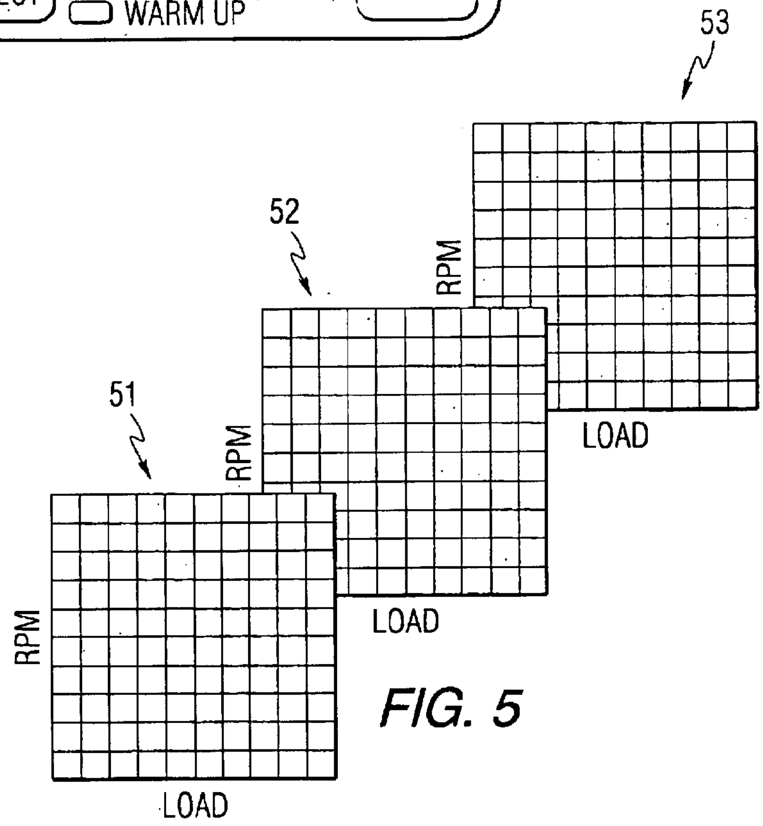
FIG. 5 shows three different sets of operational relationships that can be used in conjunction with the present invention.

FIG. 5 shows three tables of data, wherein each value in each table is stored as a function of engine speed and engine load. For example, the data stored in tables 51–53 can be ignition timing values. These ignition timing values would represent the time at which the sparkplug of the engine is fired as a function of the position of the crankshaft relating to the reciprocal movement of the piston within that associated cylinder. The operating characteristics of the engine can be changed significantly by changing the ignition timing value.

With reference to FIG. 5, each data entry position in each of the three sets, 51–53, of operational relationships would contain a number representing a degree of rotation of the crankshaft. Each of the three sets, 51–53, would contain different combinations of numbers that were calibrated to achieve a particular operating characteristic of the engine. For example, the first set of operational relationships 51 could represent a calibration that was performed for the purpose of achieving fuel economy. The second set 52 could contain values selected to achieve performance, such as acceleration and top speed. The third set 53 could represent calibration values determined to achieve performance of the engine that is best suited for trolling and slow operation. It should be understood that the particular calibration purpose for each of the sets of operational relationships, 51–53, can be significantly different than those used in this hypothetical description. In addition, it should be understood that the number of sets of operational relationships, 51–53, can be two, three, or virtually any number. In addition, each set of operational relationships can store a parameter (e.g. ignition timing value) as a function of one, two or more independent variables. For example, the stored parameter could comprise a plurality of values stored as a function of a single independent variable (e.g. engine speed), two variables (e.g. engine load and engine speed, as illustrated in FIGS. 4 and 5), or three or more independent variables, as is deemed practical for any particular application of the present invention. It should also be understood that although FIG. 5 shows a grouping of three sets of operational relationships, 51–53, the engine control module can store other groupings which contain other sets of operational relationships that relate to a different engine operating parameter. In other words, the three sets of operational relationships shown in FIG. 5 can relate to ignition timing values as a function of load and engine speed and another group of three sets of operational relationships can store various fuel per cycle data sets or, in addition, the engine control module can also store a group of three additional sets of operational relationships that relate to fuel injection timing. The present invention is not limited to the use of a single group of three sets of operational relationships such as that illustrated in FIG. 5. In addition, it should be understood that a group of data sets with only one independent variable, such as that which will be described below in conjunction with FIG. 6, can be stored in combination with a group of sets of operational relationships such as that illustrated in FIG. 5.

Figure 6:
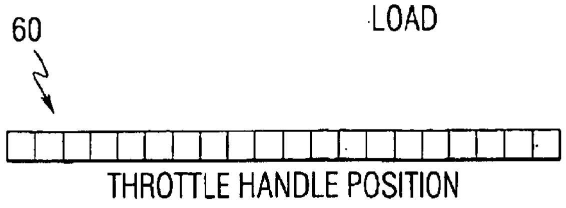
FIG. 6 shows a set of operational relationships that are stored as a function of a single independent variable.

As an example of a single independent variable being used in conjunction with a stored parameter, FIG. 6 illustrates a set of operational relationships 60 in which an angular throttle position at the throttle body of an engine is stored as a function of a throttle handle position. This example conforms with the discussion above in relation to FIG. 2. The situation represented in FIG. 6 is most applicable in marine vessels which employ an electronic remote control (ERC) system that provides a throttle handle and a throttle plate in a throttle body in which no mechanical linkage or cable is connected between the handle and the throttle body.

Figure 7:
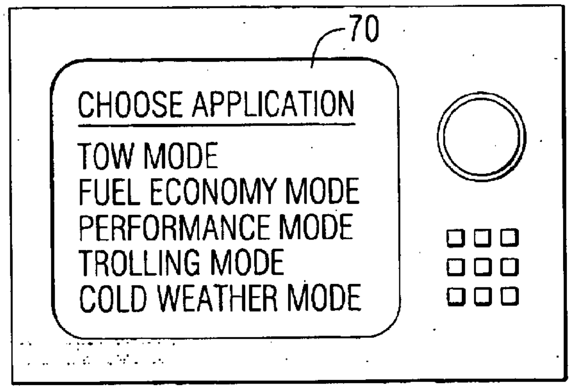
FIG. 7 is a data entry screen through which an operator can select a mode of operation in accordance with the present invention.

In order to select a chosen set of operational relationships from the group of two or more sets of operational relationships (e.g. the three sets shown in FIG. 3), the present invention provides a monitoring step that examines a manually selectable parameter. The manually selectable parameter can be any parameters that can be changed by the operator of the marine vessel. By changing the parameter to one of a plurality of optional values, the operator of a marine vessel is able to communicate with the engine control module (ECM) in a way that informs the engine control module to select one of the plurality of sets of operational relationships from each group based on the desires of the operator of the vessel. As an example, FIG. 7 shows a display screen 70 that allows the operator to choose an application such as the five illustrated in FIG. 7. Alternatively, a device such as that illustrated in FIG. 3 can be used. As will be discussed in greater detail below, a resistive component can be used to communicate a mode of operation to the engine control module. Similarly, one or more switches (e.g. rocker switches) can be used by the operator of the marine vessel to communicate a selection of operating modes to the engine control module. Based on the selection made by the operator of the vessel, the engine control module selects a chosen set of operational relationships (e.g. the set identified by reference numeral 52 in FIG. 5) from a group of sets (e.g. 51–53) and uses it as the chosen set of operational relationships to control the engine.

Figure 8:
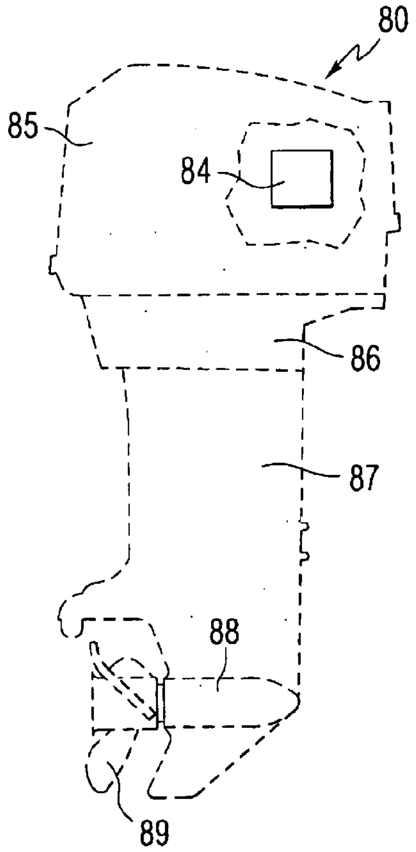
FIG. 8 is a highly simplified and schematic representation of an outboard motor with an engine control module.

With reference to FIG. 8, an outboard motor 80 is provided with an engine control module 84 which has the ability to execute software algorithms and to store digital data. In a preferred embodiment of the present invention, the digital data is stored in tables or maps such as those identified by reference numerals 51–53, 40 and 60 in the discussion above. In FIG. 8, dashed lines are used to represent an outboard motor which typically comprises a cowl 85, an adapter plate section 86, a driveshaft housing 87, a gear case 88, and a propeller 89. Although additional microprocessors can be used at a helm station to receive the operator's desired mode of operation, the present invention is described herein as being implemented by an engine control module 84 contained under the cowl 85 of an outboard motor 80.

Figure 9:
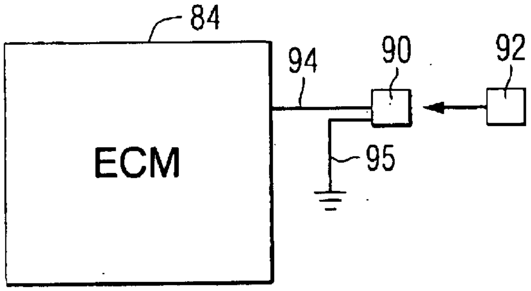
FIG. 9 shows and engine control module with a socket connected in electrical communication with it for receiving the insertion of a resistive component.

FIG. 9 illustrates an engine control module 84 with a socket 90 configured to receive a resistive component 92 in electrical communication with it. The resistance value of the resistive component 92 determines the chosen set, of the group or plurality of sets of operational relationships (e.g. 51–52 in FIG. 5). The engine control module simply reads the resistive value, between lines 94 and 95, when the resistive component 92 is plugged into the socket 90.

Figure 10:
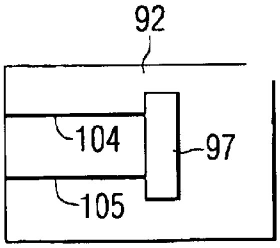
FIG. 10 is a simplified representation of the resistive component illustrated in FIG. 9.

FIG. 10 is an enlarged view of the resistive component 92. In a typical application, male pins are connected in electrical communication with wires 94 and 95. These pins, which are not illustrated in FIG. 10, are therefore connected in electrical communication with a resistive element 97 which can comprise one or more resisters. When the male pins of the resistive component 92 are plugged into corresponding female pins in the socket 90, the resistive element 97 is connected between lines 94 and 95 described above in conjunction with FIG. 9. When connected, the engine control module 84, described above in conjunction with FIG. 9, senses the resistive value between lines 94 and 95, which is represented by the resistive element 97, and selects one of the sets of operational relationships, as illustrated in FIG. 5, based on that resistive value. The system which uses the resistive component 92 is an alternative system to that described above in conjunction with FIG. 7 or the system described in conjunction with FIG. 3.

Figure 11:
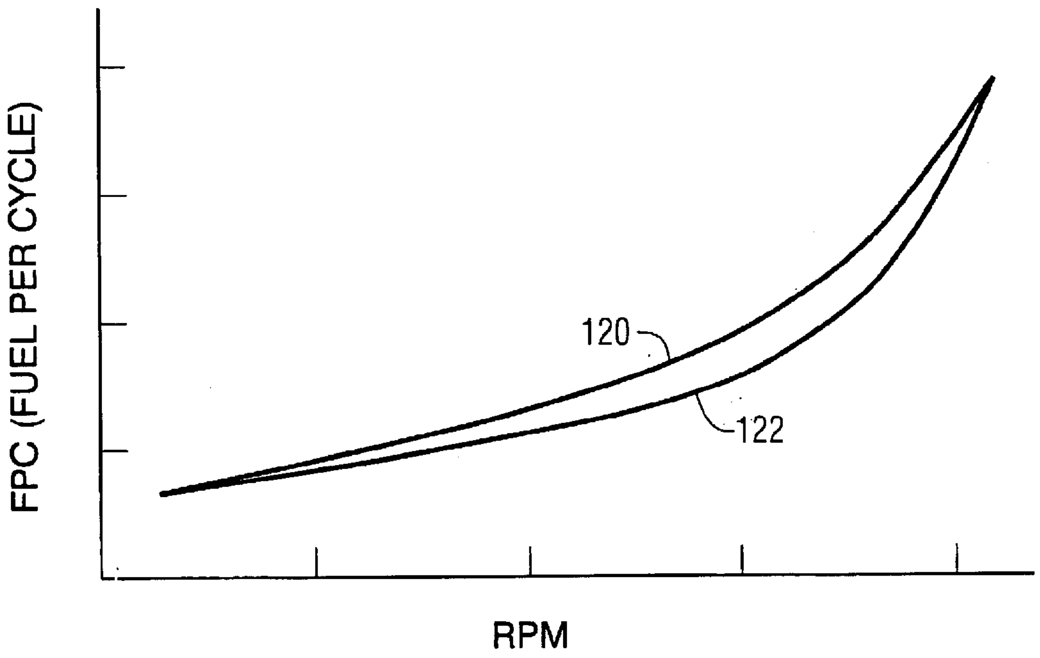
FIG. 11 is a graphical representation of the relationship between fuel per cycle (FPC) as a function of engine speed (RPM)

As an example of the results that can be achieved from a fuel economy calibration in which the operator is given two choices of sets of operational relationships to choose from, FIG. 11 is a graphical representation of the fuel per cycle magnitude selected as a function of engine speed (RPM). One set of operational relationships can be represented graphically by curve 120. A fuel economy set of operational relationships can be represented graphically by curve 122. The example shown in FIG. 11 would be stored digitally in a one dimensional dataset, such as that illustrated in FIG. 6 and described above. Alternatively, the example shown in FIG. 11 could comprise a plurality of fuel per cycle values stored as a function of both engine speed and load. However, for purposes of illustration, a single independent variable, such as engine speed (RPM) can be more clearly illustrated graphically. The digital data for fuel per cycle (FPC) for both the default situation 120 and a economy situation 122 would be stored digitally in two sets of operational relationships. When the operator makes a choice between normal operation and fuel economy operation, the present invention would select a chosen set of operational relationships. This, in effect, is a choice between curve 120 and curve 122 in FIG. 11.

Figure 12:
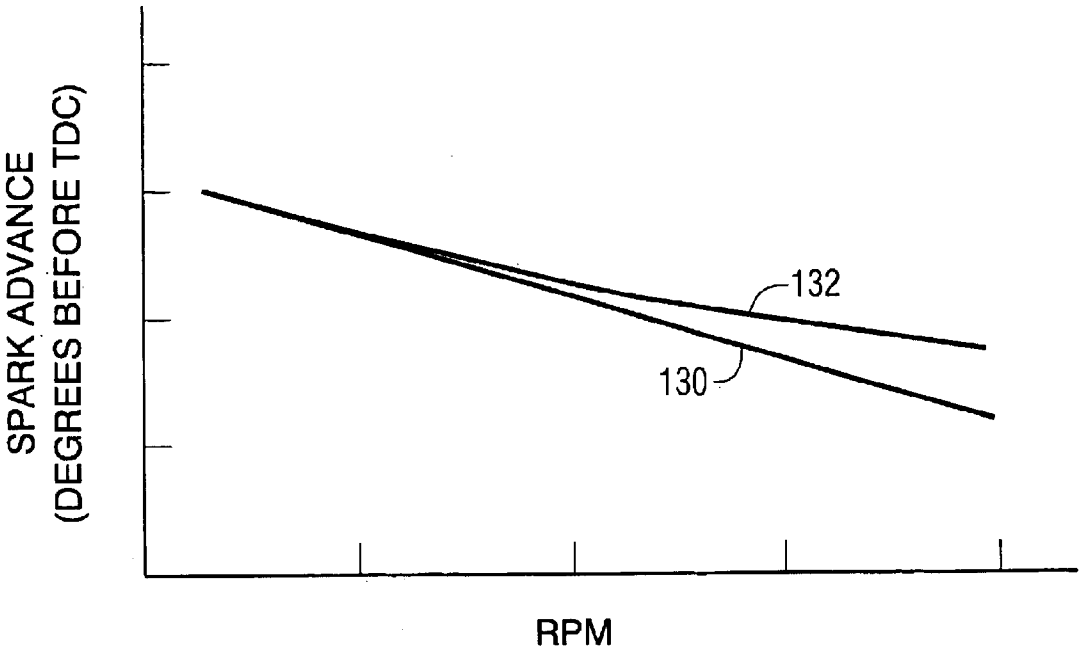
FIG. 12 is a graphical representation of spark advance as a function of engine speed.

FIG. 12 illustrates an example where two sets of operational relationships contain various spark advance magnitudes which are stored as a function of engine speed (RPM). A first set of operational relationships can relate to a default situation as represented graphically by curve 130. A high torque option could be stored digitally as a set of operational relationships that is graphically represented by a high torque curve 132.

With reference to FIGS. 11 and 12, it should be understood that selecting the default curve 120 results in an engine operation that is a balance between fuel economy and running quality. Selecting the economy curve 122 would result in an engine operation that uses less fuel per cycle but may compromise running quality under certain conditions. It might also require later injection timing and more advanced spark timing. The selection of the default curve 130 in FIG. 12 assumes that the operator of the marine vessel is using lower octane fuel and the spark advance for each engine speed is selected to limit the likelihood of engine knock. The high torque curve 132, on the other hand, assumes that the operator is using high octane fuel which allows more spark advance without experiencing engine knock.

In addition, the concepts of the present invention can be used to store calibration data which is selected to satisfy certain emissions restrictions. Those sets of operations relationships would be stored and selected as a function of the country in which the engine is intended to be operated. As various countries adopt different emissions criteria which may focus on different types of emissions (e.g. NOX, hydrocarbons, carbon monoxide), it may become necessary to calibrate the engine so that it meets the emissions standards of the country in which it is operated. The present invention could be used to select a set of operational relationships as a function of the country, wherein each country's set of operational relationships will result in the achievement of the particular type of emission standard used in that country. Achieving an emission standard for a particular country could involve a group of sets of operational relationships involving ignition timing, a different group of operational relationships involving fuel timing, and another group of sets of operational relationships relating to fuel per cycle (FPC). Each of these groups of sets of operational relationships could be stored as a function of independent variables such as engine speed and load.

It should be understood that the alternative sets of operational relationships in a preferred embodiment of the present invention comprise a dependent variable which is selected as a function of one or more independent variables. Table I shows several possible combinations of dependent variables and independent variables.

TABLE I

| DEPENDENT VARIABLE (Operational Parameter) | FIRST INDEPENDENT VARIABLE | SECOND INDEPENDENT VARIABLE |
|---|---|---|
| Engine Operating Speed (RPM) | Throttle Handle Position | |
| Ignition Timing Value (Degree) | Engine Operating Speed | Load |
| Duration of Air Injection (ms) | Engine Operating Speed | Load |
| Amount of Fuel Injected | Engine Operating Speed | Load |
| Fuel Injection Timing (degree) | Engine Operating Speed | Load |
| Throttle Plate Position | Engine Operating Speed | |

It should be understood that when both engine operating speed and load are specified in the table above as independent variables, there are situations in which the use of only one independent variable may suffice. Typically, this singe independent variable would be engine operating speed and load would not be required. However, optional applications of the present invention, like these, are not limiting to the scope of the present invention.

In summary, the present invention monitors a manual input, such as a resistive value of a resistive component 92, an entry on an input screen 70, a selection made on a selecting device such as that shown in FIG. 3, or the setting of a plurality of rocker switches, to determine the desired operating mode for an internal combustion engine. The desired operating mode is selected based on a manual input provided by the operator of the marine vessel. When the operating mode selection is made, an engine control module 84 chooses one of a plurality of sets of operational relationships based on the value or identity of the manual selection. That chosen set of operational relationships then determines how the engine will be operated under a variety of changing conditions. With reference to FIG. 5, it should be understood that the present invention may select from several pluralities of operational relationships based on the input received from the operator of the marine vessel. In other words, the present invention may select a set of operational relationships that relate to engine operating speed as a function of a manually moveable throttle selector (e.g. a handle), another chosen set of operational parameters relating to ignition timing values as a function of engine operating speed and load value, a third chosen set of values of duration of air injection stored as a function of engine operating speed and load value, and an additional chosen set of operational relationship relating to throttle plate positions for a supercharger bypass circuit which are stored as a function of engine operating speed. Any combination of dependent variable-related sets of operational relationships can be selected by the engine control module 84 as a function of the manual input.

Although the present invention has been described with particular specificity and illustrated to show several preferred embodiments, it should be understood that alternative embodiments are also within its scope.

I claim:

1. A method for controlling the operation of an internal combustion engine, comprising the steps of:

providing a first set of operational relationships which is preselected for use in a first type of application of said internal combustion engine;

providing a second set of operational relationships which is preselected for use in a second type of application of said internal combustion engine;

monitoring a manually selectable parameter;

selecting a chosen set of operational relationships from said first and second sets of operational relationships as a function of said selectable parameter; and controlling the operation of said internal combustion engine according to said chosen set of operational relationships.

2. The method of claim 1, wherein:

said manually selectable parameter is a resistance magnitude of a resistive component.

3. The method of claim 1, wherein:

each of said first and second sets of operational relationships comprises a plurality of values of engine operating speed, each of said plurality of values of engine operating speed being stored as a function of a position of a manually movable throttle selector.

4. The method of claim 1, wherein:

each of said first and second sets of operational relationships comprises a plurality of ignition timing values, each of said plurality of ignition timing values being stored as a function of both an engine operating speed value and a load value.

5. The method of claim 1, wherein:

each of said first and second sets of operational relationships comprises a plurality of values of a duration of air injection through a fuel injector during each injection event, each of said plurality of values of a duration of air injection through a fuel injector during each injection event being stored as a function of both an engine operating speed value and a load value.

6. The method of claim 1, wherein:

each of said first and second sets of operational relationships comprises a plurality of values of an amount of fuel injected through a fuel injector during each injector event, each of said plurality of values of an amount of fuel injected through a fuel injector during each injector event being stored as a function of both an engine operating speed value and a load value.

7. The method of claim 1, wherein:

each of said first and second sets of operational relationships comprises a plurality of fuel injection timing values, each of said plurality of fuel injection timing values being stored as a function of both an engine operating speed value and a load value.

8. The method of claim 1, wherein:

each of said first and second sets of operational relationships comprises a plurality of throttle plate positions for a supercharger bypass conduit, each of said plurality of throttle plate positions for a supercharger bypass conduit being stored as a function of both an engine operating speed.

9. The method of claim 1, wherein:

said manually selectable parameter is a selection made through the use of a data entry terminal.

10. The method of claim 1, wherein:

said manually selectable parameter is a status of one or more switches.

11. A method for controlling the operation of an internal combustion engine, comprising the steps of:

providing a first set of operational relationships which is preselected for use in a first type of application of said internal combustion engine;

providing a second set of operational relationships which is preselected for use in a second type application of said internal combustion engine;

monitoring a manually selectable parameter, said manually selectable parameter being selected from the group consisting of a resistance magnitude of a resistive component, a selection made through the use of a data entry terminal, and a status of one or more switches;

selecting a chosen set of operational relationships from said first and second sets of operational relationships as a function of said selectable parameter; and controlling the operation of said internal combustion engine according to said chosen set of operational relationships.

12. The method of claim 11, wherein:

each of said first and second sets of operational relationships comprises a plurality of values of engine operating speed, each of said plurality of values of engine operating speed being stored as a function of a position of a manually movable throttle selector.

13. The method of claim 11, wherein:

each of said first and second sets of operational relationships comprises a plurality of ignition timing values, each of said ignition timing values being stored as a function of an engine operating speed value.

14. The method of claim 11, wherein:

each of said first and second sets of operational relationships comprises a plurality of values of a duration of air injection through a fuel injector during each injection event, each of said plurality of values of a duration of air injection through a fuel injector during each injection event being stored as a function of an engine operating speed value.

15. The method of claim 11, wherein:

each of said first and second sets of operational relationships comprises a plurality of values of an amount of fuel injected through a fuel injector during each injector event, each of said plurality of values of an amount of fuel injected through a fuel injector during each injector event being stored as a function of an engine operating speed value.

16. The method of claim 11, wherein:

each of said first and second sets of operational relationships comprises a plurality of fuel injection timing values, each of said plurality of fuel injection timing values being stored as a function of an engine operating speed value.

17. The method of claim 11, wherein:

each of said first and second sets of operational relationships comprises a plurality of throttle plate positions for a supercharger bypass conduit, each of said plurality of throttle plate positions for a supercharger bypass conduit being stored as a function of an engine operating speed.

18. A method for controlling the operation of an internal combustion engine, comprising the steps of:

providing a first set of operational relationships which is preselected for use in a first type of application of said internal combustion engine;

storing said first set of operational relationships in a memory device which is accessible to a microprocessor;

providing a second set of operational relationships which is preselected for use in a second type of application of said internal combustion engine;

storing said second set of operational relationships in said memory device which is accessible to said microprocessor;

monitoring a manually selectable parameter, said manually selectable parameter being selected from the group consisting of a resistance magnitude of a resistive component, a selection made through the use of a data entry terminal, and a status of one or more switches;

selecting a chosen set of operational relationships from said first and second sets of operational relationships, from said memory device, as a function of said selectable parameter; and controlling the operation of said internal combustion engine according to said chosen set of operational relationships.

19. The method of claim 18, wherein:

each of said first and second sets of operational relationships comprises a plurality of values of engine operating speed, each of said plurality of values of engine operating speed being stored as a function of a position of a manually movable throttle selector.

20. The method of claim 18, wherein:

each of said first and second sets of operational relationships comprises a plurality of engine control settings, each of said plurality of engine control settings being stored as a function of an engine operating speed value.

* * * * *